Figure 2:
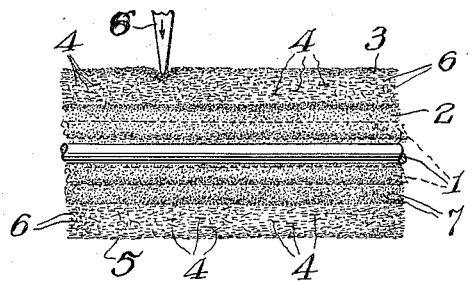

Nov. 9, 1965 W. L. GORE 3,217,083
ABRASION RESISTANT POLYMERIC FLUOROCARBONS
AND CONDUCTOR INSULATED THEREWITH
Filed Aug. 1, 1960

Insulation—2
Sheath—3
Wire—1
5—Surface of assembly
6—Fibers dispersed transversly
4—Fibers dispersed longitudinally
7—Dielectric fluid dispersed as globules Inventor:
Wilbert L. Gore
By C. H. Mortenson
Attorney United States Patent Office 3,217,083
Patented Nov. 9, 1965

3,217,083
ABRASION RESISTANT POLYMERIC FLUORO-
CARBONS AND CONDUCTOR INSULATED
THEREWITH
Wilbert L. Gore, Newark, Del., assignor to
W. L. Gore & Associates, Inc.
Filed Aug. 1, 1960, Ser. No. 46,448
13 Claims. (Cl. 174—25)

This invention relates to processes for making blends of polymeric fluorocarbons, such as poly(tetrafluoroethylene), and inorganic materials and to processes for making such polymers resistant to abrasion. Further, it relates to the products produced. More particularly, it relates to the preparation of composites of the polymeric resins with inorganic materials and to the shaping of the composites into such articles as sheets, tapes and conductors bearing the composites as insulation.

While poly(tetrafluoroethylene) has many outstanding properties and is the basis of extensive industrial activity, it has long been known that the abrasion resistance is shaped articles, such as wire coated with the polymer, is wanting. A sharp edge exerting pressure on the coating of the wire will soon force through to the wire, and this will result in a short circuiting. With the increasing demand for electrical conductors able to withstand long exposures to abrasion, to high temperature and to conditions inducive to corona initiation, among other severities, the inherent shortcomings of poly(tetrafluoroethylene) can no longer be tolerated. The need for processes leading to polymeric fluorocarbon products capable of withstanding conditions extant or possible in missile, rocket and ballistic applications is great.

Accordingly, an object of this invention is the provision of methods for improving the properties of fluorocarbon polymers such as poly(tetrafluoroethylene). Another object is the production of abrasion resistant products. A still further purpose is making available shaped articles having high resistance to abrasion, increased resistance to cold-flow and improved tensile strengths. These and other objectives will appear hereinafter.

In order to prepare the fluorocarbon for shaping, composites of it are prepared with mineral materials under conditions leading to mixtures or blends in which the mineral material is uniformly distributed. This is accomplished by mixing the inorganic materials and the polymers in finely divided form in the presence of a volatile liquid which wets both solids. The amount of liquid is controlled so that the resultant dispersion has just enough liquid to keep the mixture dispersed on standing. Separation of liquid from the dispersion is avoided. By so doing the uniformly dispersed solid particles are kept in that state during the following step of concentrating or removing the volatile liquid, as by evaporation or heating, preparatory to the shaping step. Hitherto-fore, liquid separation attended dispersion processes and the liquid separating always took with it portions of the solid, and the remaining dispersion was not uniform. Thus, in prior procedures the shaped articles were blotched or streaked and/or were non-uniform in electrical and other physical properties.

In a preferred embodiment leading to optimum physical properties, the purposes of this invention are accomplished by admixing a polymeric fluorocarbon resin with an inorganic material in fiber form and shaping the resultant organic/inorganic composite into the desired article so that the inorganic fibers are, in the main, oriented so that they lie with their lengths parallel to the surface of the shaped article. In forming the composites, suspensions of the inorganic material are mixed with the resin, and the volatile material in the resultant blend is then removed to produce a solid dispersion or mixture of the organic/inorganic materials. This solid, a dry, fine powder, is then converted to a shaped article, as by extrusion, so that the fibers are mainly parallel to the surface of the article. For example, an unsintered ribbon of the organic/inorganic composite is prepared by extrusion of the dry, powdered blend under pressure elongating the mass laterally and longitudinally. By so doing, 90% or more of the mineral fibers are made to lie in the plane of the ribbon. The unsintered ribbon is then used to coat a conductor, being sintered in the final article.

When an abrasive now works against the surface, it must wear away or work against inorganic material. Not only is this more difficult than abrading only the organic material, but the inorganic material is presenting large areas of itself to the abrader. This is also true for cut-through. When a sharp edge under pressure lies against these new products, it must force apart the hard, embedded inorganic material, and, as a result, the products greatly resist cut-through. Surprisingly, tensile strengths are increased without decrease in elongation. The substantial improvements obtained by this invention afford not only new applications of conductors but one may now have confidence in the articles' resistance to trouble making conditions hithertofore serious and frequently fatal. This invention will be further understood by reference below to the description and to the drawings which are given for illustrative purposes only, not being limitative.

Figure 1:
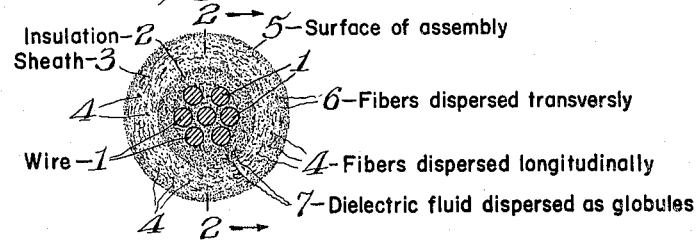
Figure 3:
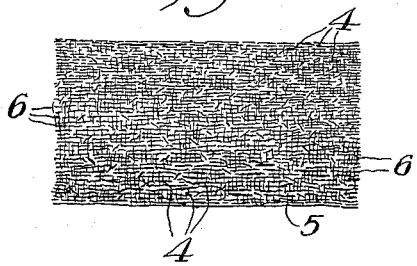

In the drawings:

FIGURE 1 is an end view of an embodiment of this invention, being a multi-conductor wire insulated in accordance with the principles of this invention;

FIGURE 2 is a sectional view of a length of the wire of FIGURE 1, illustrating also the cut-through attack and resistance; this figure is taken on line 2—2 of FIGURE 1; and FIGURE 3 is a sectional plan view of a portion of a flat surface of an article of this invention showing the alignment of a portion of the fibers parallel to the longitudinal axis and the alignment of the remaining portion of the fibers parallel to the lateral axis of the article, or in other words, showing all of the fibers lying flat in the plane defined by these axes.

As can be seen in FIGURE 1, a plurality of conductors or wires, 1, are surrounded or embedded in an insulator 2, as, for example, poly(tetrafluoroethylene). In this particular sheath 2 there are globules of a dielectric fluid shown by dots 7. Jacketing the sheath is a layer 3 of a polymer, as poly(tetrafluoroethylene), filled with mineral fibers which lie with their lengths parallel to the surface 5 of the assembly. It will be appreciated that a portion of the fibers 4 lie with their lengths parallel to the long axis of the conductor while others 6 lie with their lengths parallel to the curved or transverse axis. All fibers lie parallel to the surface. That is, they lie flat in the plane defined by the longitudinal and transverse axes. There are no fibers or very few fibers at most, that lie perpendicular to the surface. These fibers are, as shown, dispersed throughout the poly(tetrafluoroethylene) as individual fibers or at most only very small clumps of fibers. The fibers, even in the clumps, are mainly oriented parallel to the surface of the insulation. Thus, a sharp edge 8 bearing against the surface must cut through the mass of inorganic material present, and in the compression the mineral material tends to compact, resisting the cutting. In many applications of conductors a sharp edge inadvertently presses on the conductor or lies by necessity against the conductor in the ever increasing demand for lighter weight materials and the ever increasing crowding of diverse objects into small spaces, such as a nose cone. Such edges usually are metallic and will produce failure because of short circuiting. The objects of this invention very greatly reduce such possible failure, because they withstand abrasion and cut-through for very long periods of time even at high temperature.

The following examples are given not only to describe ways of producing these objects but for showing their resistive properties.

EXAMPLE I

In a conventional vessel were placed 0.22 part of a cadmium red pigment, 0.022 part of a wetting agent such as the sodium salt of the sulfuric acid ester of lauryl alcohol, and 0.185 part of water. These ingredients were stirred until they were completely mixed, and, the resultant liquid slurry was added to 1.0 part of pulverulent poly(tetrafluoroethylene). The aqueous component and the powder were mixed gently; in the mixing air was beaten into the mixture so that the resultant slurry was foamed. No separation of the liquid phase occurred on standing. The water was then removed to produce a dry color concentrate. This was then added to 9 parts of poly(tetrafluoroethylene) in the presence of a liquid hydrocarbon, and mixing was effected, producing a smooth paste which was used in extrusion to produce a colored ribbon. This product had more uniform distribution of the colored pigment than when the dry powders are mixed by a simple tumbling operation.

If too little water is used, the composite is sandy or gritty and is very difficult to mix in the subsequent steps. If too much water is used, water separates carrying with it part of the pigment. Pigment concentration in the remaining dispersion varies and a non-uniform concentrate results. Also, the pigment that separates cakes during the drying step and the concentrate contains lumps of color here and there. By maintaining the same ratio of pigment to polymer in the dispersion throughout the drying step, uniformity is attained with attendant improvement in properties and appearance in the shaped articles.

In experiments similar to the above, intimately mixed and stable dispersions were prepared using instead of the cadmium color such pigments as titanium dioxide, zinc oxide, iron oxide and chromium oxide pigments. Improved properties and appearances were attained in shaped articles prepared from the uniform composites.

EXAMPLE II

Into a container equipped with a knife-edged stirrer were placed 45 parts of water and 3 parts of fibers made from potassium titanate and stirring was effected for 15 minutes using a 5000 ft./min. peripheral velocity in which time the mass became thick and viscous. The fibers had diameters of about 1 micron and lengths ranging from 100 to 1000 microns. Initially, the fibers are available and used in clumps having diameters of ¾ inch or less and in the viscous, aqueous stage they are still mainly in small clump form, the clumps having diameters of 0.020 inch or less. To the viscous mass is added about 0.33 part of a wetting agent, such as that used in Example I, and the stirring is continued until the mixture becomes fluid. In this example, after about one hour of additional stirring the mixture very suddenly became very fluid.

To 10 parts of poly(tetrafluoroethylene) in the form of a fine powder was added 11.5 parts of the fluid slurry. Gentle stirring was applied until the mixture became a light, fluid foam, air being beaten into the mixture. The foamed mixture was thoroughly dried at 325° F. in a circulating air oven. To 1.8 parts of a high-boiling hydrocarbon was added 1.1 parts of a silicone, this being "Dow-Corning 550 Fluid," and the resultant solution was added to 10.7 parts of the dry potassium titanate/poly(tetrafluoroethylene) powder. After thoroughly mixing these ingredients, the powder was pelletized and extruded through a chamber having two co-acting chambers, the one having an orifice to extrude the mass longitudinally into a rod-like form and the other having an orifice to receive this form and to extrude it laterally into ribbon form. The latter orifice had dimensions so that the resultant ribbon was 0.030 inch in thickness and 6 inches in width. This ribbon was passed through calendar rolls in which step the thickness was reduced to 0.004 inch. The volatile hydrocarbon was then removed by heating. The resulting, unsintered ribbon was tough and could be stretched to several times its original dimensions without rupturing the ribbon.

Microscopic examination of the ribbon before removal of the hydrocarbon showed that nearly all of the fibers were oriented parallel to the sheet. They remained so upon removal of the hydrocarbon and sintering the polymer. The sintering converted the spongy structure to a homogeneous mass. Upon studying portions of the products it was concluded that about 75% of the fibers were present as individual particles, the remaining 25% being in the form of very small clumps or bundles. Practically all of the individual fibers appeared completely oriented in the plane of the flat ribbon, and those in the bundles were largely so oriented. The overall orientation was about 90%.

A length of AWG 22 wire was spirally wrapped with the unsintered 4 mil ribbon, the wire being covered with 4 layers of the ribbon. The construction was then sintered at 350° C. The thickness of the sintered insulation was 0.010 inch. A 25 foot length of this wire was placed in a salt solution and 2200 volts (A.C.-root mean square-R.M.S. voltage) was applied for one minute between the conductor and the solution. No failure occurred.

A sample of the resultant wire was tested for abrasion using standard tests and equipment described in U.S. Government Documents NAS–703 and MIL–T–5438. In the testing, a 400 grit abrasive cloth tape was pulled across the insulation with a specified load, pressing the tape against the wire. When an AWG 22 wire with a 0.010 inch coating of conventional poly(tetrafluoroethylene) coated wire is so tested, only 32 inches of the abrasive tape are required to wear through the insulation and short the conductor. For the sample of this example and of this invention similarly tested, 52 inches of the abrasive tape were required. This indicates the great difference in abrasion resistance attained by this invention.

The enhanced abrasion resistance of the products of this invention was also demonstrated by testing several samples of such products and similarly testing several samples of comparable products coated with conventional poly(tetrafluoroethylene). It was found that for the latter, the shortest amount of abrader was 30 inches and the longest was 42 inches; the average was 37 inches. On the other hand, the smallest amount for the products of this invention in the test was 48 inches and the largest was 66 inches, the average being 56 inches. Clearly, a valuable, surprising result is attained.

Samples of the insulated wire produced in this example were exposed to heat at 150° C. for 96 hours. The initial excellent abrasion resistance was unimpaired. Upon raising the temperature to 200° C. and exposing the conductor to that condition for 96 hours, still no impairment in abrasion resistance was noted. Wires coated with conventional materials such as polyvinyl chloride or the silicone rubbers have very poor abrasion resistance. Further, many of these, such as those covered with polyvinyl chloride, lose much of what little abrasion resistance they have upon such exposures to heat.

EXAMPLE III

A length of AWG 20 wire (19 strand) was wrapped with 3 layers of poly(tetrafluoroethylene) tape. This contained no mineral fibers and was 0.004 inch in thickness. The tape-wrapped construction was then fed between two converging, unsintered fiber-filled ribbons prepared as described in Example II and being 0.030 inch in thickness.

The assembly comprising the two converging ribbons and the tape wrapped wire was passed through two calendering rolls which had aligned recesses to receive the tape-wrapped wire and adjoining raised sections to press the converging unsintered sheets together as they met in the passing. The fiber filled ribbons had the same width and this was more than adequate to surround the tape wrapped wire, so that a web was formed on either side of the converging pressed assembly. The pressure was such that the two sheets being pressed together in the rolls were reduced to a thickness less than the sum of their initial thicknesses. The resultant construction, being the surrounded wire and the web was sintered at 350° C. The coating of unfilled polymer directly next to the metal was about 0.008 inch thick, and the coating of the filled polymer was about 0.020 inch. Thus, the total insulation thickness was 0.028 inch and the overall outside diameter of the insulated wire, exclusive of the webs, was 0.096 inch.

In testing the product of this example, 150 feet of it was placed in a salt bath for one minute with 4000 volts (A.C.-R.M.S.) between the conductor and the salt solution. No failure occurred. Using the abrasive test described above and a 4/0 garnet cloth abrasive, a rating of 36 inches of tape was achieved compared to only 24 inches for a commercial wire having an overall diameter of 0.100 inch made up of 0.012 inch poly(tetrafluoroethylene) next to the conductor, a braided fiberglass jacket impregnated with poly(tetrafluoroethylene) and finally a 0.010 inch poly(tetrafluoroethylene). Thus, the commercial product could withstand only ⅔ of the abrasion withstood by the product of this invention. Furthermore, dielectric failure occurred in the corona test within the one minute exposure.

In further tests, the conductor was eliminated to produce a cylindrical sleeve having an outside diameter of 0.050 inch and an inside diameter of 0.030 inch. These sintered tubular constructions had an average tensile strength of 5,200 p.s.i. and average elongations of 370%, whereas similar tubular constructions prepared from unmodified, sintered, poly(tetrafluoroethylene) in control experiments had average tensile strength of only 3,400 p.s.i. and average elongations of 350%.

In order to demonstrate the improvement on cut-through, several lengths of the sintered constructions of this example with the conductors therein were looped over a mandrel and ¾ pound weights were hung on each end of the wire. The resultant assembly was placed in an air-oven at 300° C. for eight hours at the end of which time the insulated wires were cooled and placed in the salt bath with the conventional 4,000 volt differential. No failure occurred. A similar construction prepared using unmodified poly(tetrafluoroethylene) failed the dielectric test after similar exposure on the mandrel. Examination of the conventional construction showed that the metal conductor therein had cut through the insulation where it had been compressed by the weights against the mandrel. However, examination of the construction of this invention revealed that only a slight flattening of the insulation and only a minor reduction in insulation thickness had occurred in the comparable areas contacting the mandrel. This illustrates the greatly improved cut-through resistance of the products of this invention.

In another experiment, the procedures used in Example II were repeated with a ceramic fiber instead of potassium titanate fibers. In this instance the fiber used was a chopped ceramic fiber prepared from an alumina-silica composition. Improved abrasion resistance and improved cut-through resistance were obtained.

EXAMPLE IV

To a fluid slurry of 90 parts of water and 6 parts of glass fibers having diameters of about 10 microns and lengths of about 1000 microns was added about 0.67 part of a wetting agent similar to that used in Example I, and to the resultant fluid slurry was added 20 parts of finely divided copolymer of tetrafluoroethylene and hexafluoropropylene. The polymer containing mixture was stirred until all polymer particles had been wetted and dispersed. On standing no water separated, the fluid slurry being stable. Nor did it break or conglomerate in the subsequent step of heating to remove the water and dry the composite. Water uniformly left the slurry and the ratio of polymer to inorganic material remained constant throughout the mass of the mixture. A portion of the resultant, uniform composite was melt extruded into rods which had enhanced abrasion resistance.

In a similar experiment using poly(tetrafluoroethylene) instead of the copolymer, the resultant uniform, solid powdered composite was extruded in accordance with the procedure of Example II, the silicone used being a polymethylsiloxane and the hydrocarbon used being a refined kerosene. The resultant, unsintered ribbon was comparable to that obtained using potassium titanate fibers and gave insulated conductors having resistive properties similar to those described in Example II.

EXAMPLE V

An unsintered poly(tetrafluoroethylene) tape was prepared so that it contained uniformly dispersed throughout a silicone. The preparation involved tumbling 100 grams of poly(tetrafluoroethylene) in the form of a dried powder with 28 cc. of a hydrocarbon (naphtha) and 10 cc. of Dow-Corning 550, as the dielectric fluid, the tumbling being continued until uniform mixing resulted. The resultant mixture was then extruded through a die containing two orifices in series, the first designed to extrude the material in the form of a rod stretching it longitudinally and the second being in the form of a slit orifice designed to extrude the rod material in the form of a thin ribbon, thus stretching the material laterally and producing a sheet or ribbon of long length. The resultant tape was rolled to a tape of 0.002 inch in thickness.

A second unsintered tape was prepared by the procedure given in Example I using potassium titanate as the mineral fiber and producing a 0.004 inch thickness. An AWG 22 wire was wrapped with four layers of the dielectric containing tape and then was further wrapped with three layers of the tape containing the potassium titanate. The resultant assembly was sintered in an oven at 360° C. The sintered conductor had a coating thickness of 0.012 inch, the inner core being 0.005 inch thick and the outer core being 0.007 inch thick. As noted in other examples, the potassium titanate fibers in the outer core were largely oriented parallel to the surface of the article.

To test the corona resistance of the product, the insulated wire was immersed in a water bath containing a dispersing agent and a voltage differential of 3,000 volts R.M.S. was applied between the conductor and the water bath. After 50 hours, no failure had been noted. This demonstrated the outstanding corona resistance of the product.

To test the abrasion resistance of the product, samples were subjected to the action of an abrading tape, in accordance with the NAS-703 for AWG 22 wire. It was found that 56 inches of the abrasive tape were required to abrade the product of this example, whereas only 35 inches of the same abrasive tape was required to abrade a comparable conductor coated with unmodified, sintered poly(tetrafluoroethylene).

To compare the deformation resistance of the product of this invention to the deformation resistance of a conventional conductor, samples of each were placed on an anvil 1 inch from a fulcrum, and a ¹⁄₁₆" mandrel was pressed at right angles to the axis of each of the samples by hanging a 500 gm. wt. on the end of a 10 inch lever. This multiplied the 500 gm. load by 10. In each case the time required to cut through the insulation of the conventional wire coated with standard poly(tetrafluoroethylene) was measured and the time in the test on the wire of this invention was run up to 15 minutes, the results being given in the following table.

*Table I*

| Trial | Time Fiber filled wire | Time Control (straight PTFE) |
|---|---|---|
| 1 | Greater than 15 min | 4.0 min. |
| 2 | Greater than 15 min | 3.75 min. |
| 3 | Greater than 15 min | 4.50 min. |
| 4 | Greater than 15 min | 3.75 min. |

As can be seen above, in every case the control failed in less than 5 minutes whereas the products of this invention still resisted the deformation after 15 minutes of exposure to the cutting pressure.

While this invention has been described mainly with reference to poly(tetrafluoroethylene), the principles of this invention apply to other fluorocarbons such as poly(chlorotrifluoroethylene) or copolymers of tetrafluoroethylene with ethylene or with fluorinated propylenes, such as hexafluoropropylene, or with chlorotrifluoroethylene. Of the various fluorocarbons, poly(tetrafluoroethylene) is of the greatest interest since its physical and chemical characteristics coupled with the enhanced abrasion and other resistive properties attained by this invention makes for top-quality, reliable products.

Any of the conventionally used lubricants can be used in the extrusion step including, naphtha gas, kerosene, "Soltrol," and the like. Similarly, the wetting agent used in this invention may be any of those commercially available such as the quaternary ammonium salts or the sulfonated oils or alcohols. Usually a sodium salt of the sulfuric acid esters of long chain alcohols is employed.

For example, the sodium salt of the ester obtained using sulfuric acid and lauryl alcohol is most frequently used, this being available commercially as "Dupanol" AWG. The amount of wetting agent used is not critical, and only that amount that gives good wetting with reasonably short mixing time needs to be used. In fact, in certain instances no added wetting agent is required, as, for example, when the liquid wets both the mineral and the polymer. It is necessary to wet both the mineral particles such as the mineral fibers and the powdered particles of the polymer. Depending upon the selection of the mineral and the polymer, a liquid will frequently be found that wets both. For example, methanol does this frequently. Other liquids that may be used besides water and methanol are naptha-gas, ethers such as dimethyl ether of ethylene glycol, esters such as ethyl acetate, hydrocarbons and halogenated hydrocarbons such as those from kerosene and benzene. However, when water is being used with poly(tetrafluoroethylene), a wetting agent, such as the sodium salts described, is necessary for water alone will not wet poly(tetrafluoroethylene). In the preparation of the compositions of the mineral material and the polymeric material dry mixing processes have not been found to be as effective as the liquid mixing processes of this invention. Generally the mixing step is effected at room temperature, but heat may be applied if desired though it normally is not necessary to do so, nor is it normally necessary to cool the components.

In order to get uniform blends not only is a liquid medium used but the amount of liquid is controlled so that the resultant dispersion remains uniformly mixed on standing. In the preparation of a given composition of mineral and polymeric material, one can readily determine the exact amount of liquid which will remain contained by using an excess of the liquid and then slowly adding the powdered polymer until the stable end point is achieved. When the polymerized powder is added to such aqueous dispersions or organic dispersions of the mineral, frequently air gets mixed into the liquid so that foam results, but this foaming is not essential. It is important to maintain the uniform mixed liquidation of the mineral and the polymerized powder so that the composite is still in the uniformly blended condition when it is shaped into such articles as ribbons, tapes, rods, gaskets, linings, coatings, sheets, laminates, printed circuits and the like. While this invention has been described mainly the products of and the properties of electrical conductors, it should be noted that the products of this invention are of considerable use in other applications, for example, in coating cables, in covering various types of pipes and hose which are subject to considerable flexing or attack by chemicals and in linings for all types of containers such as barrels, drums and tanks. Products of this invention are particularly of interest in lining square tanks, because the products may be stretched in both directions to provide strong, resistive corners for the tanks.

In preparation of the composites, the amount of the mineral that is used generally is from about 3% to about 25% by weight of the combined weight of the mineral and the polymer in use. Generally, the composites have about 5% to about 15% of their weight made up by the mineral material, a 10% amount being most frequently used. As can be seen from the above the polymers are in pulverulent form and the mineral materials are also finely divided. The fibers used may be any of many mineral fibers available commercially including the potassium titanate fibers, glass fibers and ceramic fibers. Of the latter, the aluminasilica fibers are usually used, although mineral fibers prepared from or containing zirconium oxide, boron oxides and others may be used. Usually, the fibers are white, but if desired they may be colored and used in color coding. For such purposes, colored oxides, such as those of cadmium or cobalt, are incorporated in the ceramic fibers.

With respect to the potassium titanate fibers, these have diameters varying from 0.1 to about 10 microns and lengths varying from about 100 to about 1,000 microns. The fibers prepared from alumina-silica generally have diameters varying from about 1 to about 10 microns with lengths from about 100 to about 10,000 microns. The glass fibers, as obtained commercially and used in this invention, have diameters averaging about 10 microns and lengths varying from 1,000 to about 10,000 microns. In one instance glass fibers were used in which some of the fibers had lengths of 0.25 inch and improvements in abrasion and cut through were obtained. However, it is preferred not to use fibers that long because it is more difficult to obtain the desired orientation. Further, the fibers of the composites of this invention are for the greatest part individually embedded in the polymer. In their parallel, oriented condition they are randomly spaced—that is, they are not placed in rows, but rather a fiber parallel to another will lie so that its end extends beyond the end of the adjacent fiber. The resultant surface is one which presents almost a complete, continuous mineral surface, this effect being shown in FIGURE 3.

Generally, the fibers will have diameters of 0.5 to 10 microns and lengths of 100 to 10,000 microns, and fibers less than 10,000 microns in length are usually used. Thus, the desired result is attained using the short fibers, and it is preferred to use fibers which have lengths varying from about 500 to about 5,000 microns. Use of the inorganic fibers, such as the potassium titanate fibers, affords an advantage in those instances in which temperatures are encountered which are above the melting point or decomposition point of the polymeric insulation. When the temperature gets that high, as occurs in re-entry of objects into the earth's atmosphere, the polymeric material decomposes into gaseous materials. With prior constructions the conductor is laid bare on such exposures. The mineral fibers used in this invention resist heat at 1200° C. and higher, and therefore with the products of this invention as the polymer volatilizes the inorganic fibers form a mat around the metallic conductor which mat not only acts as a good thermal insulation but acts as an electrical insulation. This is a distinct advantage.

Usually conventional stirrers and stirring speeds are employed. In some instances the fibers as obtained commercially require subdivision and to effect this sharp-edged stirrers and high speeds will be used. In many instances all of the ingredients that will make up the material used in the shaping step may be incorporated at the same time and simultaneously blended, but for many purposes it is preferable to prepare a color concentrate or a fiber/polymer concentrate separately and then use the composite in preparing the ultimate extrusion material from the polymer. Thus, it will be appreciated that in making the composites of this invention mixtures of liquids, inorganic or organic, may be used and mixtures of inorganic solids, as, for example, pigments and fibers, may be used. Similarly, mixtures of polymers may be employed.

With respect to the dielectric containing products, any material which stops or absorbs ionic discharge may be used. Such a material may be selected from the various silicone oils such as Dow-Corning-200 or 550, these being organopolysiloxanes such as polyisobutylsiloxane, polymethylsiloxane, poly(fluorinated diphenyl) siloxane and the like. Also, perfluorinated kerosene, perfluorinated lubricating oils and pyromellitic esters of perfluoroalcohols, such as the pyromelletic ester of perfluoro-n-octanol may, among other materials, be used. Normally, a siloxane will be employed.

The metallic conductors may be copper, nickel clad copper, steel strands, copper weld, beryllium copper and the like. The conductors may also be rod or ribbon or strip in shape. The improved abrasion and cut through resistance is of particular interest where flat surfaces are involved, as in printed circuits, the exposure to attack and possible failure being great.

From above it can be seen that shaped articles from the products of this invention may be obtained by extrusion of the products. Molding techniques may also be used. In the production of insulated conductors, the conductors may be tape wrapped or they may be produced by the calendering process described above. If desired, the solid pulverulent blends of the mineral and polymer may be used directly in conditioning wire by extrusion techniques using such powder, but for top physical properties it is preferred to shape the composites of this invention into sheets or tapes and then form the assembly desired.

While the invention has been disclosed herein in connection with certain embodiments and certain structural and procedural details, it is clear that changes, modifications or equivalents can be used by those skilled in the art; accordingly such changes within the principles of the invention are intended to be inclined within the scope of the claims below.

I claim:
1. A shaped article containing a fluorocarbon polymer and mineral fibers substantially in the form of individual particles embedded therein, said fibers being oriented in the said article so that the fibers in any given plane parallel to the surface of the said article lie mainly with their lengths parallel to the said surface of the said article, said fibers thereby presenting large areas of a mineral to abrading, cutting and similar forces exerted on said surface of said article, and said polymer having an elongation of at least 100% longitudinally and laterally and a tensile strength which exceeds 4,000 p.s.i.

2. A shaped article in accordance with claim 1 in which the said fiber is present in amounts of from about 3% to about 25% of the combined weights of said polymer and said fiber.

3. A shaped article in accordance with claim 1 in which the said polymer is unsintered.

4. A shaped article in accordance with claim 1 in which the said polymer is sintered.

5. A shaped article in accordance with claim 1 which is in pellicle form.

6. A shaped article in accordance with claim 1 in is an insulation material.

7. A shaped article in accordance with claim 1 in which said fiber is made from potassium titanate.

8. A shaped article in accordance with claim 7 in which said fibers have diameters of about 0.5 micron to about 10 microns and have lengths of about 100 microns to about 1,000 microns.

9. As a new article of manufacture an insulated electrical conductor comprising a metallic conductor embedded in a sheath comprising a fluorocarbon polymer and surrounding said sheath a layer of a fluorocarbon polymer having embedded therein mineral fibrils substantially in the form of individual particles which largely lie with their lengths parallel to the surface of the said conductor, the fibrils in a given plane parallel to a given surface extending in various axes in said plane and said fibrils thereby presenting large areas of mineral to abrading, cutting and similar forces exerted on said surface of said conductor, and said polymer having an elongation of at least 100% longitudinally and laterally and a tensile strength which exceeds 4,000 p.s.i.

10. An article in accordance with claim 9 in which said polymer in said sheath contains a dielectric fluid material dispersed therein.

11. An article in accordance with claim 10 in which said dielectric material is a siloxane.

12. An article in accordance with claim 9 in which the said polymer is poly(tetrafluoroethylene).

13. An article in accordance with claim 9 in which the said polymer is sintered.

References Cited by the Examiner
UNITED STATES PATENTS

| | | | |
|---|---|---|---|
| 2,454,625 | 11/48 | Bondon | 174—120 |
| 2,578,522 | 12/51 | Edgar | 174—110 |
| 2,691,694 | 10/54 | Young | 174—110 |
| 2,710,266 | 6/55 | Hochberg. | |
| 2,782,179 | 2/57 | Lontz | 260—29.6 |
| 2,841,470 | 7/58 | Berry | 252—62 |
| 2,866,769 | 12/58 | Happoldt | 260—29.6 |
| 2,891,921 | 6/59 | Kumnick et al. | 260—29.6 |
| 2,898,229 | 8/59 | Herr et al. | |
| 2,898,631 | 8/59 | Jeffery. | |

OTHER REFERENCES

Barksdale: "Titanium," Ronald Press Co., N.Y. (1949), page 98.

LARAMIE E. ASKIN, *Primary Examiner.*

BENNETT G. MILLER, JOHN P. WILDMAN, JOHN F. BURNS, *Examiners.*

UNITED STATES PATENT OFFICE
CERTIFICATE OF CORRECTION

Patent No. 3,217,083                        November 9, 1965

Wilbert L. Gore

It is hereby certified that error appears in the above numbered patent requiring correction and that the said Letters Patent should read as corrected below.

Column 1, line 20, for "is" read -- in --; column 8, line 30, for "aluminasilica" read -- alumina-silica --; column 9, line 57, for "inclined" read -- included --; column 10, line 15, for "in", second occurrence, read -- which --.

Signed and sealed this 18th day of October 1966.

(SEAL)
Attest:

ERNEST W. SWIDER                                  EDWARD J. BRENNER
Attesting Officer                                          Commissioner of Patents